(12) United States Patent
Whittaker et al.

(10) Patent No.: US 7,171,593 B1
(45) Date of Patent: Jan. 30, 2007

(54) DISPLAYING ABNORMAL AND ERROR CONDITIONS IN SYSTEM STATE ANALYSIS

(75) Inventors: Bruce Ernest Whittaker, Lake Forest, CA (US); Leland Elvis Watson, Temecula, CA (US); Scott Lane Brock, Lake Forest, CA (US); Stephanie Ninh Truong, West Covina, CA (US)

(73) Assignee: Unisys Corporation, Blue Bell, PA (US)

( * ) Notice: Subject to any disclaimer, the term of this patent is extended or adjusted under 35 U.S.C. 154(b) by 481 days.

(21) Appl. No.: 10/741,391

(22) Filed: Dec. 19, 2003

(51) Int. Cl.
*G06F 11/00* (2006.01)
(52) U.S. Cl. .......................................... 714/57; 714/46
(58) Field of Classification Search ................. 714/46, 714/57; 717/125
See application file for complete search history.

(56) References Cited

U.S. PATENT DOCUMENTS

| | | | | |
|---|---|---|---|---|
| 5,819,028 A | * | 10/1998 | Manghirmalani et al. | 714/57 |
| 5,941,996 A | * | 8/1999 | Smith et al. | 714/47 |
| 5,999,933 A | * | 12/1999 | Mehta | 707/100 |
| 6,173,422 B1 | * | 1/2001 | Kimura et al. | 714/57 |
| 6,353,899 B1 | * | 3/2002 | Martin et al. | 714/57 |
| 6,430,706 B1 | * | 8/2002 | Santerre et al. | 714/36 |
| 6,631,409 B1 | * | 10/2003 | Watson et al. | 709/224 |
| 6,654,915 B1 | * | 11/2003 | Lu et al. | 714/57 |
| 6,658,586 B1 | * | 12/2003 | Levi | 714/4 |
| 6,718,384 B2 | * | 4/2004 | Linzy | 709/224 |
| 6,718,489 B1 | * | 4/2004 | Lee et al. | 714/43 |
| 6,915,461 B1 | * | 7/2005 | Watanabe | 714/57 |
| 2002/0198983 A1 | * | 12/2002 | Ullmann et al. | 709/224 |
| 2003/0154191 A1 | * | 8/2003 | Fish et al. | 707/2 |
| 2004/0073854 A1 | * | 4/2004 | Windl | 714/57 |
| 2005/0102572 A1 | * | 5/2005 | Oberlaender | 714/29 |
| 2005/0177656 A1 | * | 8/2005 | Hwang et al. | 710/22 |

\* cited by examiner

*Primary Examiner*—Bryce P Bonzo
(74) *Attorney, Agent, or Firm*—Phuong-Quan Hoang; Mark T. Starr; Richard Gregson

(57) ABSTRACT

An embodiment of the present invention is a technique for providing a graphical user interface (GUI) to view system state of a computer system. An error window displays an error condition of a failed unit in a plurality of functional units in a computer system based on a panel dump file. A warning window shows a warning condition that potentially causes a problem in analyzing system state of the computer system or the error condition.

32 Claims, 8 Drawing Sheets

| ⓘ PanelBrowser [Magma1.txt] loaded | | _ ☐ ☒ |
|---|---|---|
| File   Fetch panel   Help | | |

| SlamStops | Hardware | Panels |

Slam-Stop Register    [Expand Slam Info]

MSU-0    (x0261)    Critical Enabled
MSU-1    Not present
MSU-2    Not present
MSU-3    Not present

— $210_1$

SubPOD 0-0    (x0361)    Stopped on CRITICAL Errors
SubPOD 0-1    (x0361)    Stopped on CRITICAL Errors
SubPOD 1-0    Not present
SubPOD 1-1    Not present
SubPOD 2-0    Not present
SubPOD 2-1    Not present
SubPOD 3-0    Not present
SubPOD 3-1    Not present — $210_k$

DIB 0-0    (x0a61)    Critical Enabled
DIB 0-1    Not present
DIB 1-0    Not present
DIB 1-1    Not present
DIB 2-0    Not present
DIB 2-1    Not present
DIB 3-0    Not present
DIB 3-1    Not present

— $210_N$

| Error Summary | Panels | View Report | Search | ? | Exit |

DISPLAYING ABNORMAL AND ERROR CONDITIONS IN SYSTEM STATE ANALYSIS

CROSS-REFERENCE TO RELATED APPLICATIONS

This application is related to the following patent applications: Ser. No. 10/741,455, entitled "Panel Grouping For System State Analysis"; Ser. No. 10/741,398, entitled "Diagnostic Tools For System Analysis Using Panel Dump File"; Ser. No. 10/741,397, entitled "Automatic Analysis Of Memory Operations Using Panel Dump File"; Ser. No. 10/742,158, entitled "Automatic Analysis Of Memory-Mapped I/O Operations Using Panel Dump File"; Ser. No. 10/742,115, entitled "Backward Location Finder Search In Panel Dump File"; Ser. No. 10/742,116, entitled "Recording Relevant Information In A GUI Window Of A Panel Dump Browser Tool"; Ser. No. 10/742,117, entitled "Reconstructing Bus Activities Using A Panel Dump File"; all filed on the same date and assigned to the same assignee as the present application, the contents of each which are herein incorporated by reference.

BACKGROUND

1. Field of the Invention

Embodiments of the invention are in the field of system analysis, and more specifically, relate to system state analysis tools.

2. Description of Related Art

System crashes as a result of faulty software are usually detected by the operating system. The operating system typically saves the state of system memory in a memory dump file. A debugger tool is used off-line to analyze such memory dump files. In the cases where the crashes are caused by hardware failures, memory dump file containing information regarding the state of the system memory cannot be used for the analysis since it is the state of the system component elements, not the state of the system memory, that is required. This state of the system is usually represented by the contents of the registers and/or storage elements relevant to the operation of the system. For large systems, the core of the hardware architecture may include a large number of processors, application specific integrated circuits (ASICs), etc. In large systems, the system state may be accessed through various means by a system maintenance processor. The system maintenance processor organizes the state into panels as the hardware state is taken. This state is then saved into a large text file called a panel dump file. A panel is a grouping of state bits that logically work together.

Examining the contents of the panel dump file to obtain meaningful interpretation of the system state is a challenge. Existing techniques for analysis of the system state has a number of drawbacks. An expert typically uses some text editing tool and search manually through the panel dump file for pertinent and helpful data. The procedure requires a high level of expertise and is very time-consuming and error-prone.

SUMMARY OF THE INVENTION

An embodiment of the present invention is a technique for providing a graphical user interface (GUI) to view system state of a computer system. An error window displays an error condition of a failed unit in a plurality of functional units in a computer system based on a panel dump file. A warning window shows a warning condition that potentially causes a problem in analyzing system state of the computer system or the error condition.

BRIEF DESCRIPTION OF THE DRAWINGS

The invention may be best understood by referring to the following description and accompanying drawings that are used to illustrate embodiments of the invention. In the drawings:

FIG. 2 is a diagram illustrating an error window with listing of normal and faulty units according to one embodiment of the invention.

DESCRIPTION

An embodiment of the present invention is a technique for providing a graphical user interface (GUI) to view system state of a computer system. An error window displays an error condition of a failed unit in a plurality of functional units in a computer system based on a panel dump file. A warning window shows a warning condition that potentially causes a problem in analyzing system state of the computer system or the error condition.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the present invention is a panel dump browser tool to analyze system state and/or behavior of a computer system from a panel dump file. The system state is typically represented or defined by a set of relevant registers internal to a number of devices, processors, or ASICs. The panel dump browser tool has a graphical user interface (GUI) that presents the state information of the computer system in a well-structured and well-organized manner.

The GUI of the panel dump browser tool provides a number of benefits to the user. First, it provides the user an overview of the system state including the status of individual units in the system. Second, it reduces the human effort and the level of expertise by identifying units that are faulty. Third, it provides warning to the user about the potential problems in the data and/or the system. Fourth, it pinpoints data or information that may be relevant in the analysis.

Figure 1A:
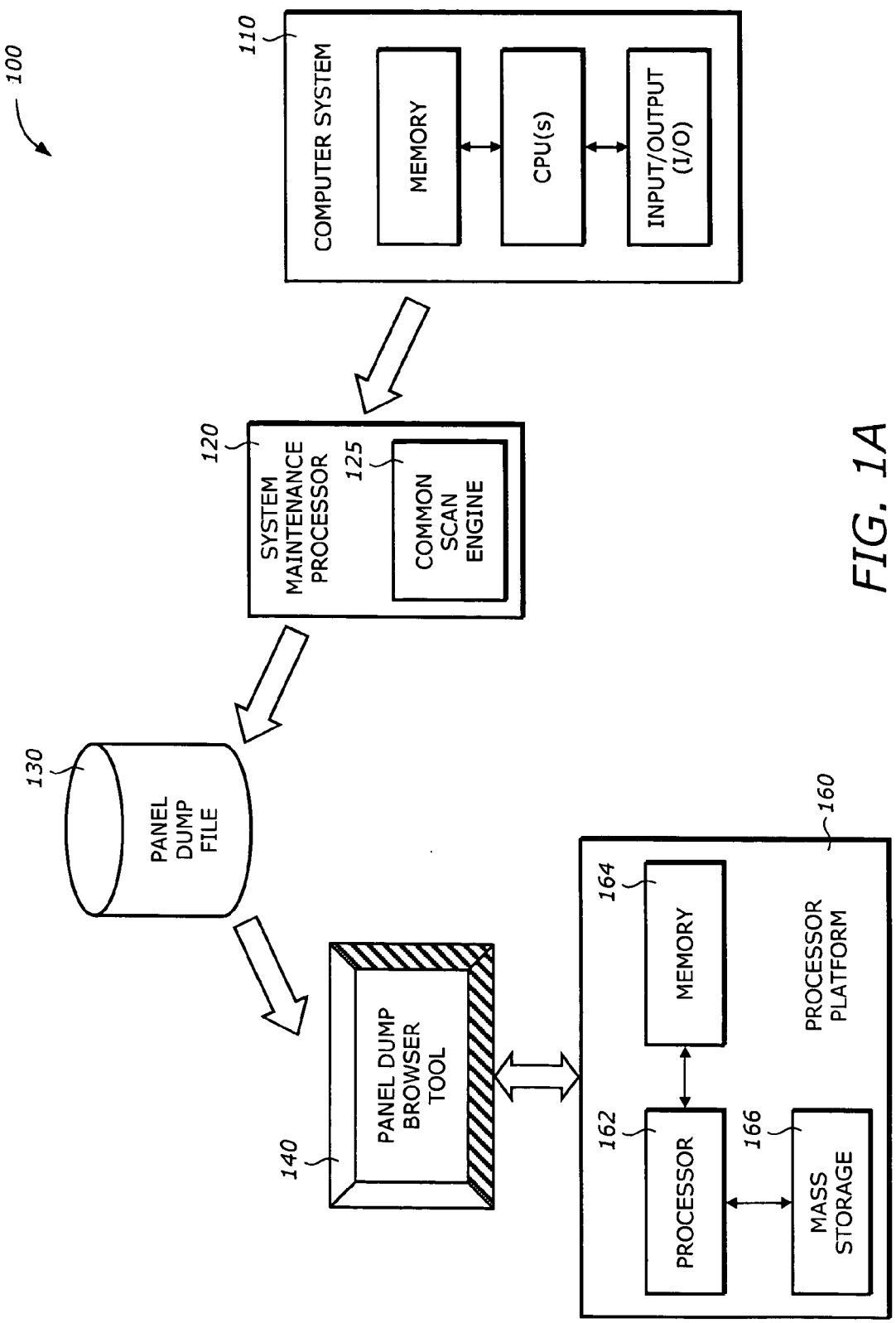
FIG. 1A is a diagram illustrating a system in which one embodiment of the invention can be practiced
Figure 1B:
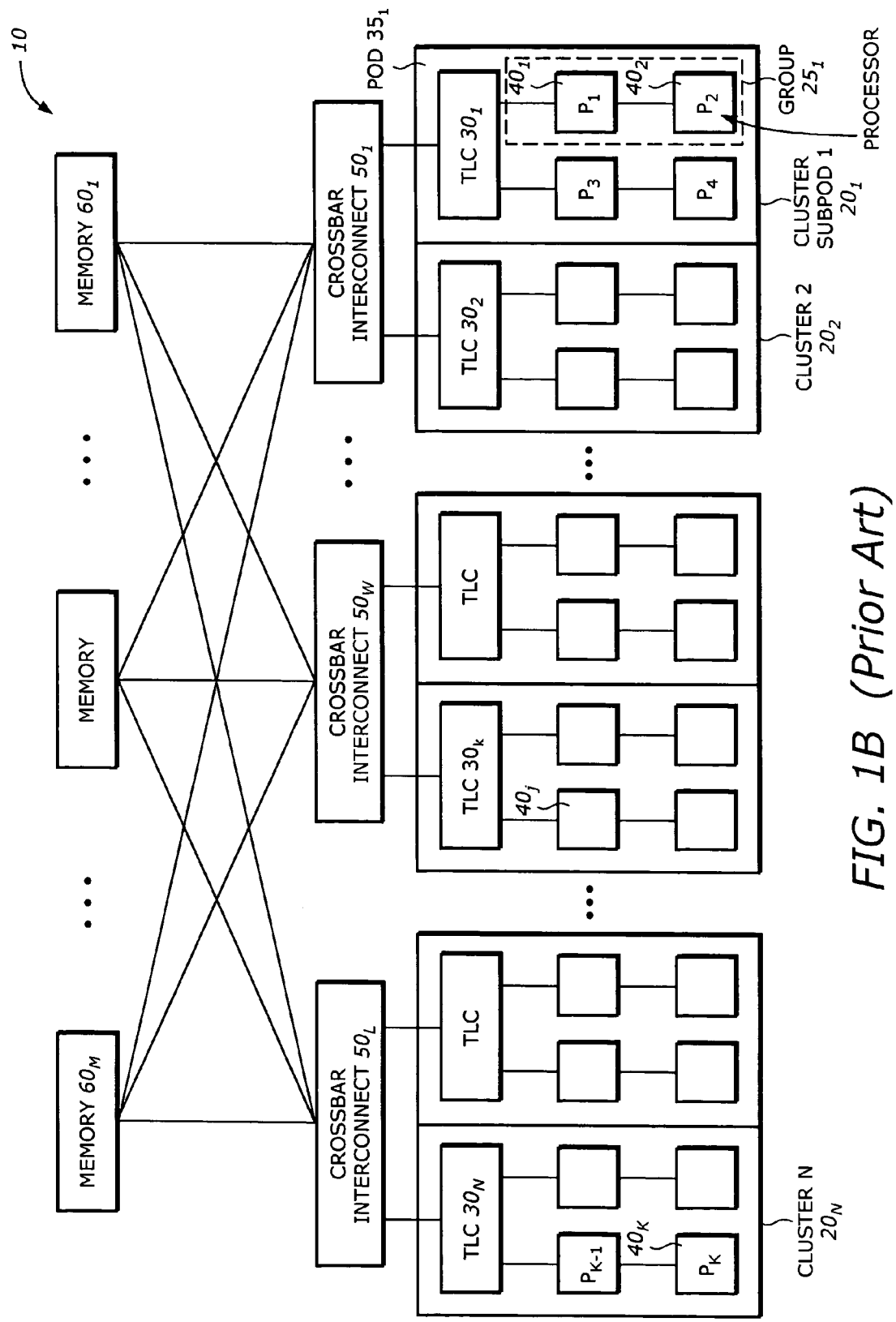
FIG. 1B is a diagram illustrating an embodiment of the computer system 110 of FIG. 1A.

The system state analysis tool may interface with a multiprocessor system as described in FIG. 1B, a single processor system, or any other systems. Special drives, routines, or functions are provided to read the contents of the registers. A system state is presented as a snapshot of these registers. The GUI allows the user to use any convenient wired or wireless input devices to navigate such as mouse, keyboard, trackball, etc. An action is performed when input device is activated or clicked when it is positioned at an appropriate location on the display screen.

FIG. 1A is a diagram illustrating a system 100 in which one embodiment of the invention can be practiced. The system 100 includes a computer system 110, a system maintenance processor 120, a panel dump file 130, a panel dump browser tool 140, and a processor platform 160.

The computer system 110 may be any computer system. It may be a multiprocessor system, a cellular multiprocessor system, a single processor system, a network of computers, an array of processors, etc. Typically, the computer system 110 is functionally organized as having a hierarchical structure of several levels. At the highest level, the computer system 110 may have several functional units of different types. For each type of functional unit, there may be several identical functional units. For example, the computer system 110 may be a cellular multiprocessor system which consists of clusters of processors. Each cluster of processors forms a subpod. There may also be several memory storage units (MSU's) which are connected to the subpods. Each subpod may contain several processors, each having similar or different functions. Each processor may include several elements such as data queue, arithmetic logical unit, memory read register, memory write register, etc. Since the architecture of the computer system 110 may be quite complex, it is useful to show the relationships of these functional units or subunits in a logical manner.

The system maintenance processor 120 is a processor that is dedicated to monitor the computer system 110 and to extract state information from the computer system 110 during a crash or at any other point in time. The system maintenance processor 120 may have access to several test points in the computer system 110. These test points may be provided at various status registers or serial shift registers for testing purposes. The system maintenance processor 120 includes a common scan engine 125. The common scan engine 125 scans all or most components of the computer system 110 to read their status or content, or state information. When there is a hardware failure that causes system crash, or upon an operator's command instructions, the system maintenance processor 120 retrieves the state information and write all the information in the panel dump file 130 on a mass storage device for off-line analysis.

The panel dump file 130 is a file that contains all the necessary state information for analysis. The panel dump file 130 in essence is a text file arranged according to how the system maintenance processor 120 retrieves the information. For a large computer system such as a cellular multiprocessor system, the panel dump file 130 may contain several thousands lines of text.

The panel dump browser tool 140 is a system analysis tool that reads the panel dump file 130 and organizes the state information in a useful form. The panel dump browser tool 140 has a GUI that allows the user to examine the state information by navigating through several display panels or screens.

The processor platform 160 is a computer system that interfaces with the panel dump browser tool. It includes a processor 162, a memory 164, and a mass storage device 166.

The processor 162 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 164 stores system code and data. The memory 164 is typically implemented with dynamic random access memory (DRAM) or static random access memory (SRAM). The system memory may include program code or code segments implementing one embodiment of the invention. The memory 164 includes a panel dump browser tool 140 when loaded from mass storage. The panel dump browser tool 140 may also simulate the system panel browsing functions. The panel dump browser tool 140 contains instructions that, when executed by the processor 162, cause the processor to perform the tasks or operations as described in the following.

The mass storage device 166 stores archive information such as code, programs, files, data, databases, applications, and operating systems. The mass storage device 166 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 166 provides a mechanism to read machine-accessible media. The machine-accessible media may contain computer readable program code to perform tasks as described in the following.

FIG. 1B is a diagram illustrating an embodiment 10 of the system 110 of FIG. 1A. The system 10 includes N clusters of processors $20_1$ to $20_N$, L crossbar interconnects $50_1$ to $50_L$ and M memories $60_1$ to $60_M$. The system 10 is referred to a cellular multiprocessor system.

Each of the clusters of processors $20_1$ to $20_N$ forms a subpod and includes a number of processor subsystems $40j$'s and a third level cache (TLC) $30_k$'s. The processor subsystems $40_j$'s within each cluster $20i$ further form into groups connected together via a bus structure. Each group is connected to the TLC $30_k$. It is contemplated that the number of processor subsystems $40_j$'s in a group and the number of groups in a cluster may be any suitable number according to the configuration. As illustrated in FIG. 1A, the processor subsystems $40_j$'s form two groups and each group consists of two processor subsystems. Each of the TLC $30_k$'S provides another level of cache memory in addition to the second level (L2) and first level (L1) caches in each of the processor subsystems $40j$'s. Each of the TLC $30_k$'S provides a larger cache memory than the L2 and L2 cache to improve performance by allowing the processors within a subpod or group to share cached information. The TLC $30k$'s may be implemented by any suitable memory technologies, including static random access memory (SRAM) and dynamic random access memory (DRAM). It is contemplated that a cache coherence protocol is maintained throughout the system 10.

Each of the crossbar interconnects $50_1$ to $50_L$ is a crossbar switch connected to the memories $60_1$ to $60_M$ and a number of clusters of processors. The clusters of processors that are connected to each crossbar interconnect form a pod. The crossbar interconnect $50_m$'s fully connects any one of memories $60_1$ to $60_M$ to any one of the clusters of processors in the pod that it is connected to. Each of the memories $60_1$ to $60_M$ is accessible to any of the processor subsystems $40j$'s via the crossbar interconnects $50_m$'s. The memories may be implemented by any suitable memory technologies including SRAM and DRAM.

FIG. 2 is a diagram illustrating an error window 200 with listing of normal and faulty units according to one embodiment of the invention. The error window 200 includes N panels $210_1$ to $210_N$.

The N panels $210_1$ to $210_N$ show the operating conditions of the functional units using at least one of a normal indicator and an error indicator. The normal indicator is used to indicate that the unit is in a normal condition. The error indicator is used to indicate that the unit is in an error or faulty condition. The indicators may include icons, symbols, colors, font types, text styles, or any other indicators that have informative and/or useful attributes. For example, a green color may be used in the font describing the name of a normal unit and a red color may be used to describe a faulty unit.

Each of the panels $210_1$ to $210_N$ shows the conditions of functional units for each type. In a computer system, there may be several types of functional units. Each type may contain a number of functional units. Not all of the functional units in each type are used for the particular configuration of the system being analyzed. For example, the computer system 110 may be a cellular microprocessor system that has four main types of functional units: the MSU, the CI, the subpods, and the DIB types. The panel $210_1$ shows the MSU functional units. In this example, there are a maximum of 4 MSU's in the system, but only one MSU is actually used. The remaining three are not used. The units are displayed with indicators to indicate whether they are actually configured or used in the system. For example, the indicator may be the font color of the text used to describe the unit. The green color is used to show that the unit is actually used and is in normal condition. The red color is used to show that the unit is actually used and is in a faulty condition. The units that are not used are grayed out.

Figure 3:
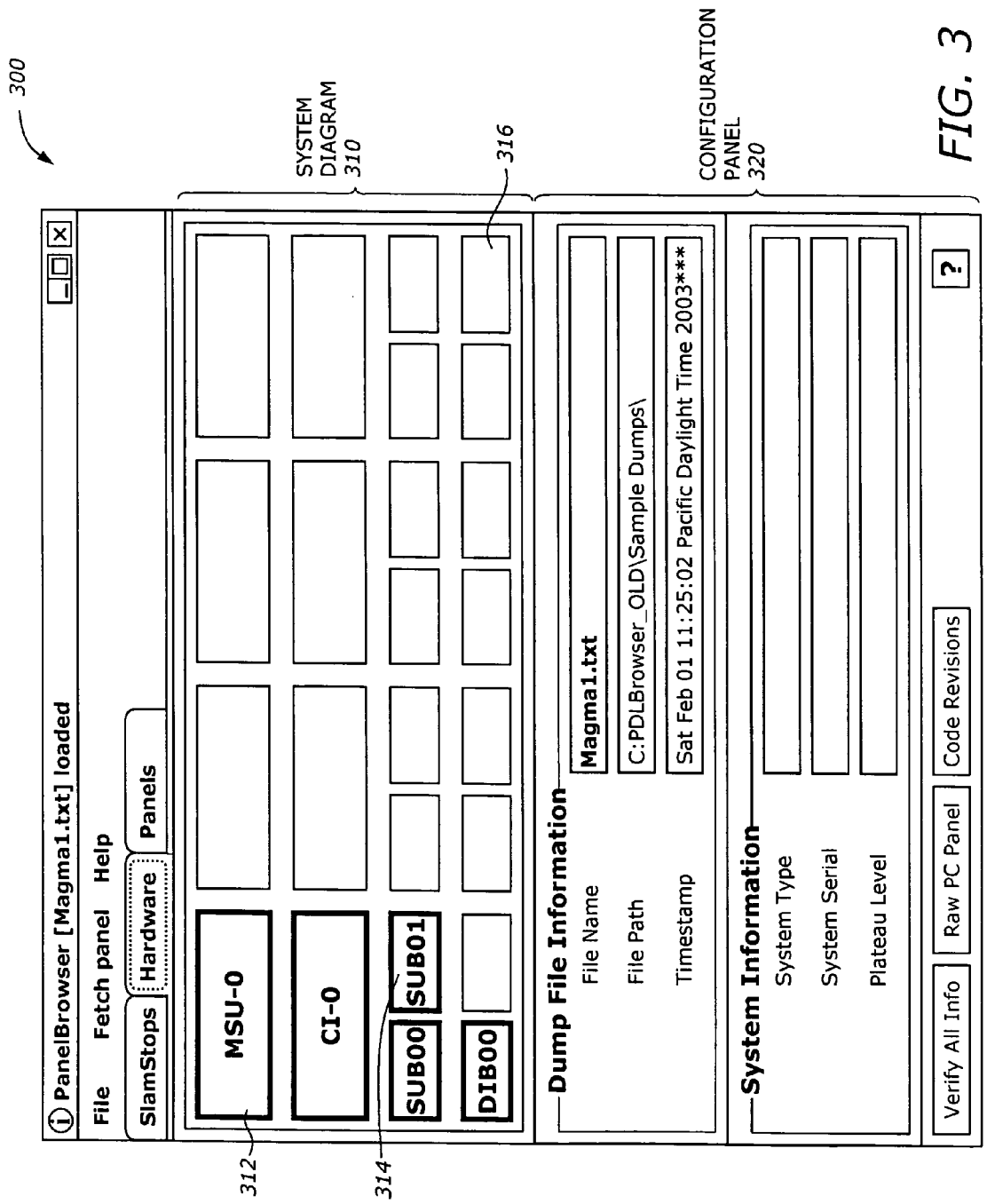
FIG. 3 is a diagram illustrating an error window with hardware diagram of normal and faulty units according to one embodiment of the invention.

FIG. 3 is a diagram illustrating an error window 300 with hardware diagram of normal and faulty units according to one embodiment of the invention. The error window 300 includes a system diagram 310 and a configuration panel 320.

The system diagram 310 shows the units in block diagram format using distinguishing indicators such as icons, symbols, and color. The indicators are used to indicate if a unit is used and normal, is used and faulty, or is not used. For example, the unit 312 is shown in green color to indicate that it is used in the system and is normal. The unit 314 is shown in red color to indicate that it is used in the system and is faulty. The unit 316 is shown in gray to indicate that is not used or configured in the system being analyzed. By showing the units with distinguishing indicators, the GUI provides the user a quick view of the overall systems so that the user can focus more on the problematic units.

The configuration panel 320 shows the configuration information on the configuration of the system. For example, it may include information on the panel dump file and the attributes of the overall system.

Figure 4:
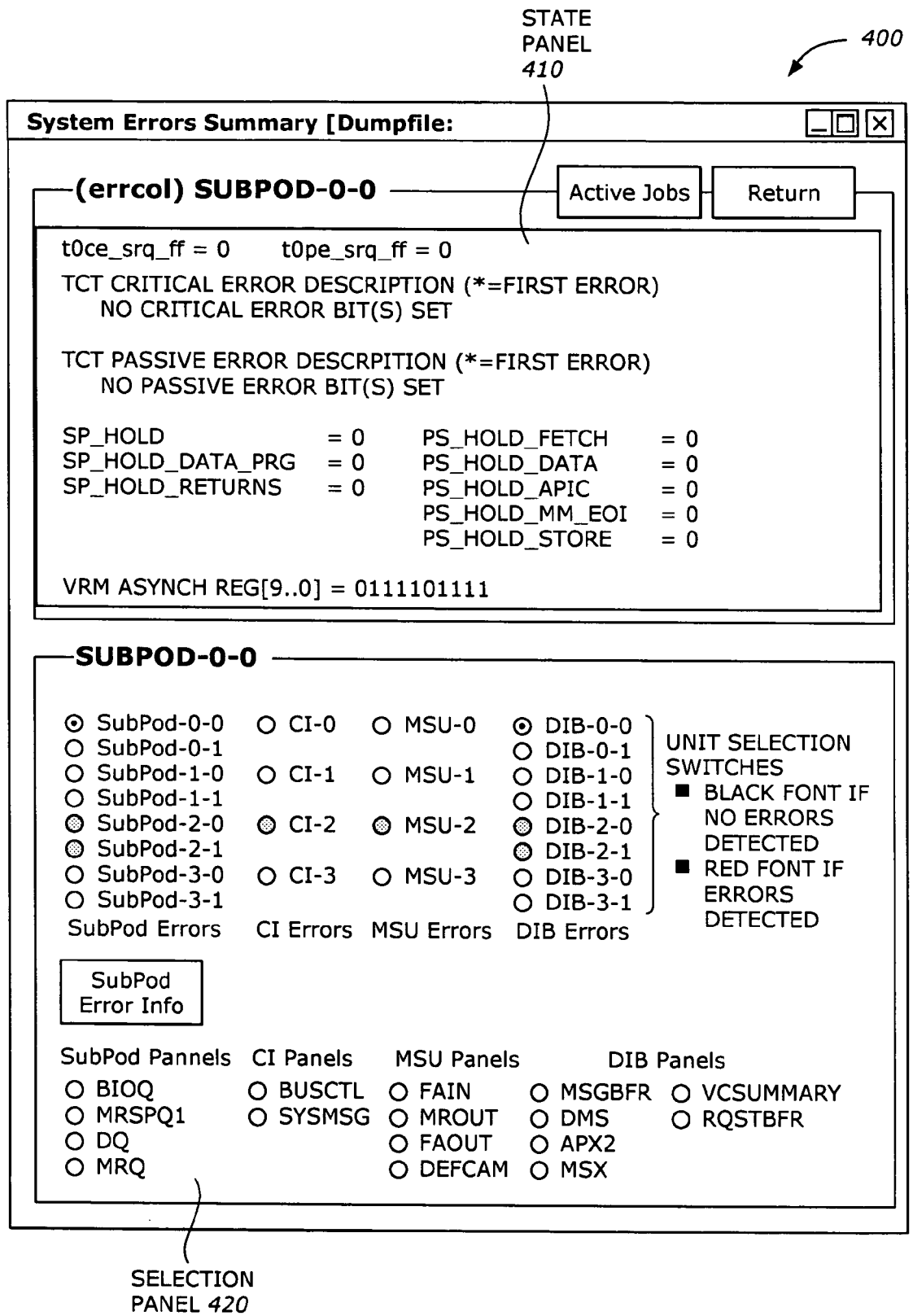
FIG. 4 is a diagram illustrating an error window with selection panel according to one embodiment of the invention.

FIG. 4 is a diagram illustrating an error window 400 with selection panel according to one embodiment of the invention. The error window 400 includes a state panel 410 and a selection panel 420.

The state panel 410 shows the error information of the failed unit. The error information may include a summary of the error condition and the relevant state information of the unit. The error information may also show that the unit has no error and is normal. The name of the unit being displayed may be coded with distinguishing indicators (e.g., icons, colors). For example, it may be shown in red if there is an error in the unit. The relevant state information includes the data of the critical elements in the unit. The data may be represented as any suitable number format (e.g., decimal, hexadecimal, binary) according to the usual manner that the element is viewed.

The selection panel 420 allows a user to select one of the functional units for viewing. It also shows the units that are actually used/configured or not used/configured in the system being analyzed. The names of the units to be selected may also be coded with distinguishing indicators. For example, a red color may be used to indicate that the unit is used and is faulty. A gray color may be used to indicate that the unit is not used or not configured. Each time the user clicks to select a unit, the state panel 410 is updated to show the error information of the selected unit.

Figure 5:
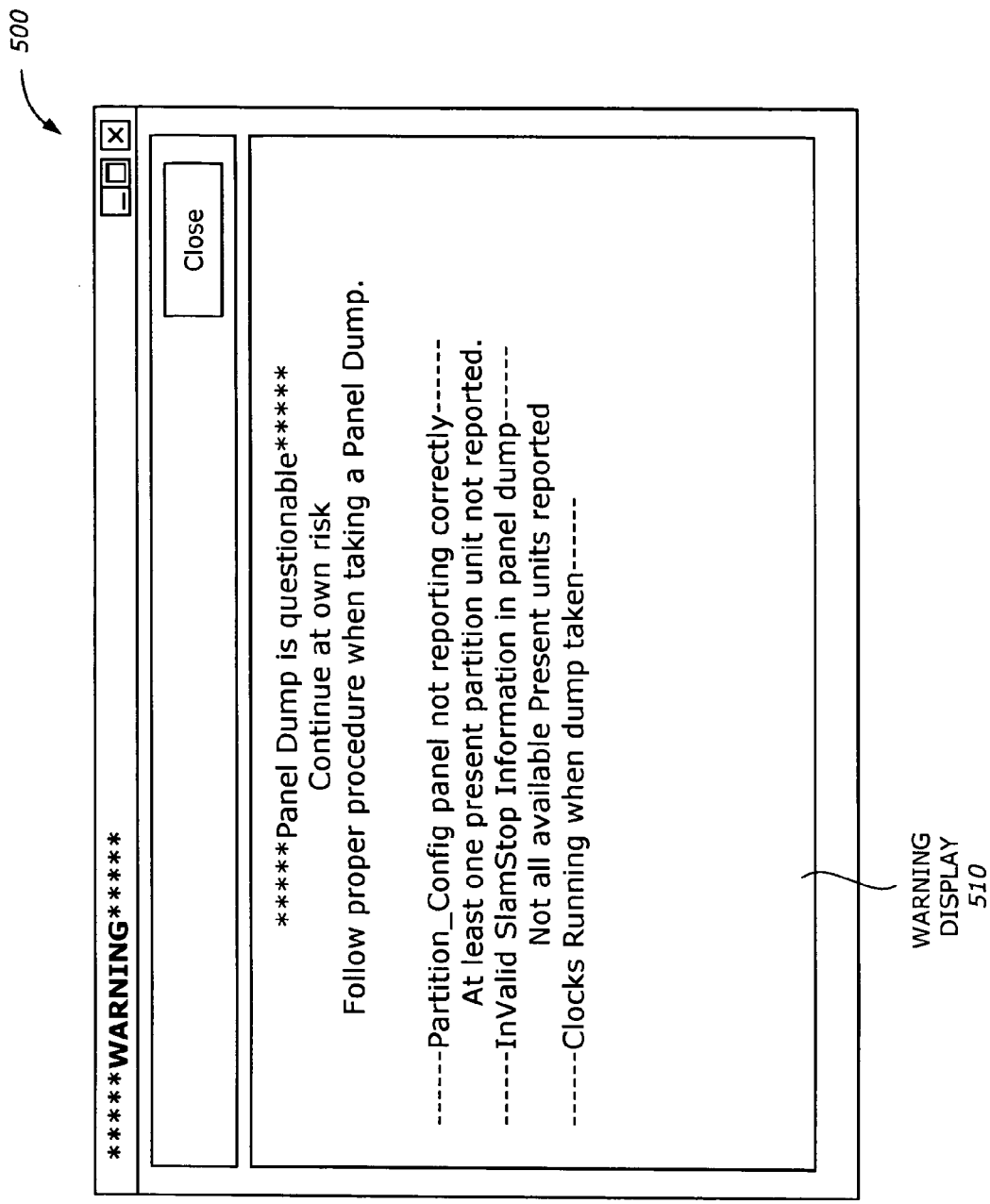
FIG. 5 is a diagram illustrating a warning window with warnings about the panel dump file according to one embodiment of the invention.

FIG. 5 is a diagram illustrating a warning window 500 with warnings about the panel dump file according to one embodiment of the invention.

The warning window 500 includes a warning display 510 to how the warning condition in the panel dump file. The panel dump file itself may have problems that may affect the significance of the state information. It is, therefore, useful to warn the user about these problems. It is also useful to warn the user about the operating condition of the system when the panel dump file is extracted.

Figure 6:
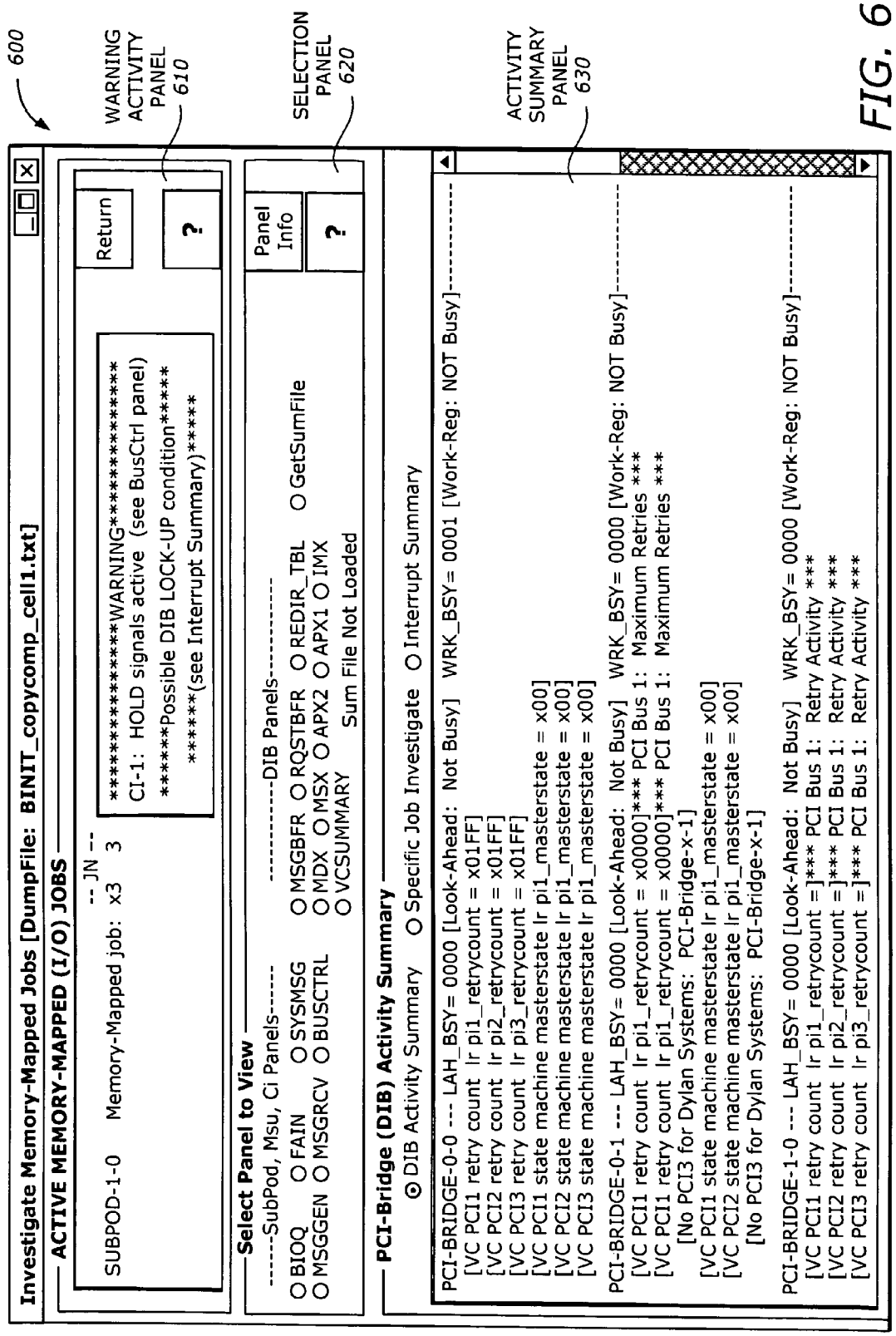
FIG. 6 is a diagram illustrating a warning window with warnings about the units in the system according to one embodiment of the invention.

FIG. 6 is a diagram illustrating a warning window 600 with warnings about the units in the system according to one embodiment of the invention. The warning window 600 includes a warning activity panel 610, a selection panel 620, and an activity summary panel 630.

The warning activity panel 610 shows the warning condition of a unit. The warning condition may indicate a possible situation that may be caused by some abnormal behavior of the system. For example, a lock-up condition may be created because the bus hold signal is active. The warning may not be the cause of the system or unit failure, but it is a condition that is abnormal or unexpected that deserve the user's attention.

The selection panel 620 allows a user to select one of the functional units or subunits in a function unit for viewing. The warning activity panel 610 shows the warning condition of the selected unit. In case no unit is selected, the warning activity panel 610 may show the unit that has the most warnings or the most critical warning.

The activity summary panel 630 summarizes the activities of the units or the subunits. The activity is usually the main activity or the activity that reflects the function of the unit at the time the dump panel file is taken. There may also be an activity selection panel to allow the user to select the type of activity summary. For example, it may be a state information summary, a hardware-related event summary (e.g., interrupt, data transfer).

Figure 7:
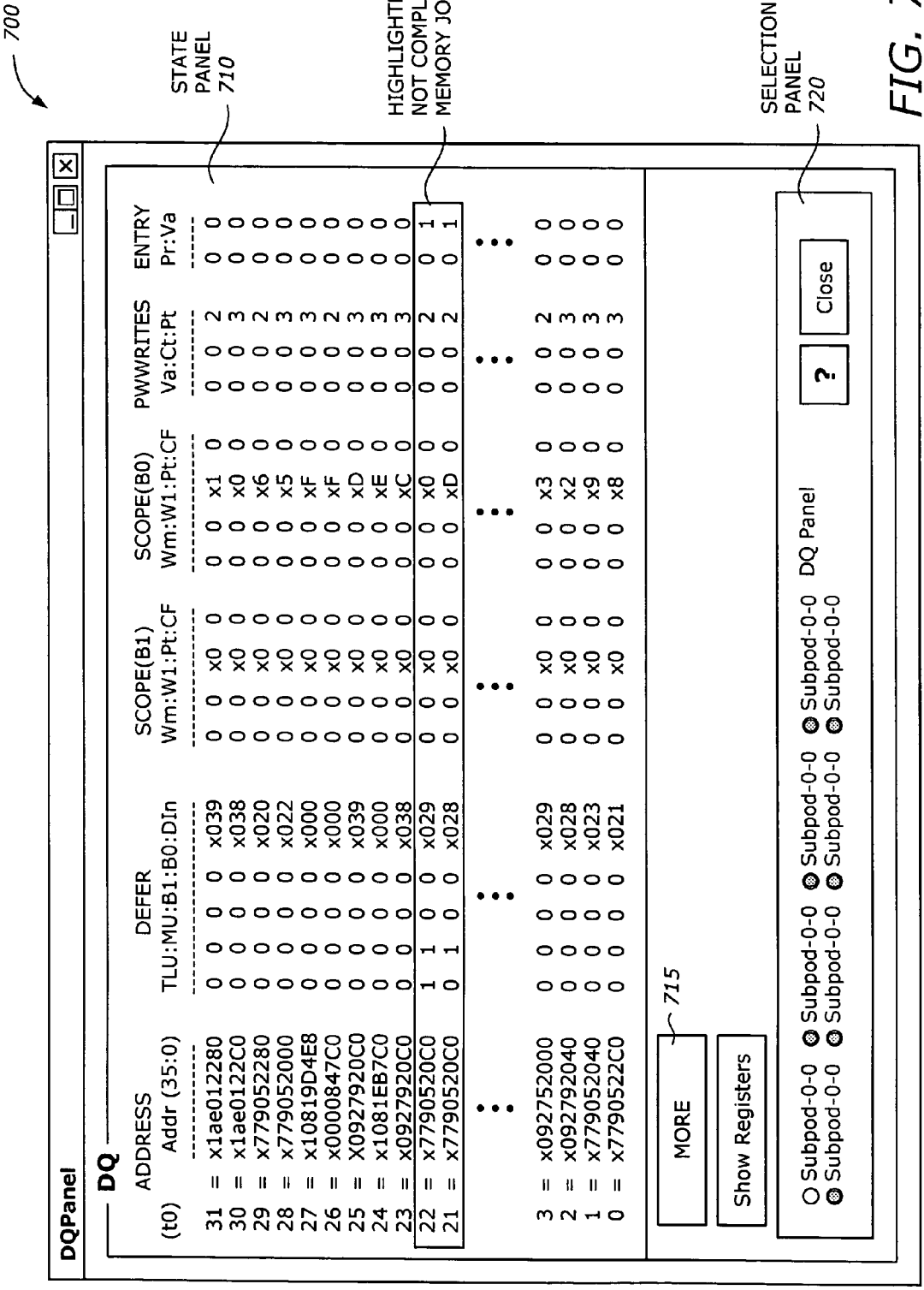
FIG. 7 is a diagram illustrating a state information window with highlighted entries according to one embodiment of the invention.

FIG. 7 is a diagram illustrating a state information window 700 according to one embodiment of the invention. The state information window 700 includes a state panel 710 and a selection panel 720.

The state panel 710 displays the state information of the unit selected by the user from the selection panel 720. The state information contains entry or entries highlighted to attract attention of the user. A button More 715 may be provided to display additional state information if desired. The state information may be overwhelming, the user or analyst may not be able to remember relevant or critical elements, events, or activities of the elements. By highlighting these relevant entries, the GUI alerts the user to be more attentive to the information. The highlighted entries or fields typically indicate that the entries or fields contain important information that useful for the analysis. This information may be the cause of failure and therefore need special attention.

The state information may be presented in an organized manner. For example, the state data may be displayed with a suitable number format (e.g., decimal, hexadecimal, binary). In addition, the element name may be coded with suitable distinguishing indicators, such as font type, icons, or associated symbols.

The selection panel 720 allows the user to select a unit for viewing from the functional units or subunits. The selection panel 720 shows all the possible units in the system with distinguishing indicators. For example, black font may be used to indicate a unit is used/configured; and gray font may be used to indicate that a unit is not used/configured.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A graphical user interface comprising:
    an error window to display an error condition of a failed unit in a plurality of functional units in a computer system based on a panel dump file; and
    a warning window to show a warning condition that potentially causes a problem in analyzing system state of the computer system or the error condition.

2. The graphical user interface of claim 1 wherein the error window comprises:
    a plurality of panels to show operating conditions of the functional units, the panels showing the functional units using at least one of a normal indicator and an error indicator.

3. The graphical user interface of claim 1 wherein the error window comprises:
    a state panel to show error information of the failed unit; and
    a selection panel to allow a user to select one of the functional units for viewing.

4. The graphical user interface of claim 1 wherein the warning window comprises:
    a warning display to show the warning condition in the panel dump file.

5. The graphical user interface of claim 1 wherein the warning window comprises:
an warning activity panel to show the warning condition;
a selection panel to allow a user to select one of the functional units for viewing; and
an activity summary panel to summarize activities of the selected one of the functional units.

6. The graphical user interface of claim 1 further comprising:
a state information window to show state information of a unit, the state information containing an entry highlighted to attract attention from the user.

7. The graphical user interface of claim 6 wherein the state information window comprises:
a selection panel to allow a user to select a unit for viewing from the functional units; and
a state panel to display state information of the selected unit.

8. The graphical user interface of claim 1 wherein the computer system is a cellular multiprocessor system.

9. A method comprising:
displaying an error condition of a failed unit in a plurality of functional units in a computer system based on a panel dump file in an error window; and
showing a warning condition that potentially causes a problem in analyzing system state of the computer system or the error condition in a warning window.

10. The method of claim 9 wherein displaying the error condition in the error window comprises:
showing operating conditions of the functional units in a plurality of panels using at least one of a normal indicator and an error indicator.

11. The method of claim 9 wherein displaying the error condition in the error window comprises:
showing error information of the failed unit in a state panel; and
allowing a user to select one of the functional units for viewing, using a selection panel.

12. The method of claim 9 wherein showing the warning condition in the warning window comprises:
showing the warning condition in the panel dump file using a warning display.

13. The method of claim 9 wherein showing the warning condition in the warning window comprises:
showing the warning condition in a warning activity panel;
allowing a user to select one of the functional units for viewing using a selection panel; and
summarizing activities of the selected one of the functional units in an activity summary panel.

14. The method of claim 9 further comprising:
showing state information of a unit in a state information window, the state information containing an entry highlighted to attract attention from the user.

15. The method of claim 14 wherein showing state information of a unit in the state information window comprises:
allowing a user to select a unit for viewing from the functional units using a selection panel; and
displaying state information of the selected unit in a state panel.

16. The method of claim 9 wherein the computer system is a cellular multiprocessor system.

17. An article of manufacture comprising:
a machine-accessible storage medium including data that, when accessed by a machine, cause the machine to perform operations comprising:
displaying an error condition of a failed unit in a plurality of functional units in a computer system based on a panel dump file on an error window; and
showing a warning condition that potentially causes a problem in analyzing system state of the computer system or the error condition in a warning window.

18. The article of manufacture of claim 17 wherein the data causing the machine to perform the operation of displaying the error condition in the error window comprise data that, when accessed by the machine, cause the machine to perform operations comprising:
showing operating conditions of the functional units in a plurality of panels using at least one of a normal indicator and an error indicator.

19. The article of manufacture of claim 17 wherein the data causing the machine to perform the operation of displaying the error condition in the error window comprise data that, when accessed by the machine, cause the machine to perform operations comprising:
showing error information of the failed unit in a state panel; and
allowing a user to select one of the functional units for viewing, using a selection panel.

20. The article of manufacture of claim 17 wherein the data causing the machine to perform the operation of showing the warning condition in the warning window comprise data that, when accessed by the machine, cause the machine to perform operations comprising:
showing the warning condition in the panel dump file using a warning display.

21. The article of manufacture of claim 17 wherein the data causing the machine to perform the operation of showing the warning condition in the warning window comprise data that, when accessed by the machine, cause the machine to perform operations comprising:
showing the warning condition in a warning activity panel;
allowing a user to select one of the functional units for viewing using a selection panel; and
summarizing activities of the selected one of the functional units in an activity summary panel.

22. The article of manufacture of claim 17 wherein the data further comprise data that, when accessed by the machine, cause the machine to perform operations comprising:
showing state information of a unit in a state information window, the state information containing an entry highlighted to attract attention from the user.

23. The article of manufacture of claim 22 wherein the data causing the machine to perform the operation of showing state information of a unit in the state information window comprise data that, when accessed by the machine, cause the machine to perform operations comprising:
allowing a user to select a unit for viewing from the functional units using a selection panel; and
displaying state information of the selected unit in a state panel.

24. The article of manufacture of claim 9 wherein the computer system is a cellular multiprocessor system.

25. A system comprising:
a processor; and
a memory coupled to the processor, the memory containing instructions that, when executed by the processor, cause the processor to:
display an error condition of a failed unit in a plurality of functional units in a computer system based on a panel dump file on an error window; and show a warning condition that potentially causes a problem in analyzing system state of the computer system or the error condition in a warning window.

26. The system of claim 25 wherein the instructions causing the processor to display the error condition in the error window comprise instructions that, when executed by the processor, cause the processor to:

show operating conditions of the functional units in a plurality of panels using at least one of a normal indicator and an error indicator.

27. The system of claim 25 wherein the instructions causing the processor to display the error condition in the error window comprise instructions that, when executed by the processor, cause the processor to:

show error information of the failed unit in a state panel; and allow a user to select one of the functional units for viewing, using a selection panel.

28. The system of claim 25 wherein the instructions causing the processor to show the warning condition in the warning window comprise instructions that, when executed by the processor, cause the processor to:

show the warning condition in the panel dump file using a warning display.

29. The system of claim 25 wherein the instructions causing the processor to show the warning condition in the warning window comprise instructions that, when executed by the processor, cause the processor to:

show the warning condition in a warning activity panel;

allow a user to select one of the functional units for viewing using a selection panel; and summarize activities of the selected one of the functional units in an activity summary panel.

30. The system of claim 25 wherein the instructions further comprise instructions that, when executed by the processor, cause the processor to:

show state information of a unit in a state information window, the state information containing an entry highlighted to attract attention from the user.

31. The system of claim 30 wherein the instructions causing the processor to show state information of a unit in the state information window comprise instructions that, when executed by the processor, cause the processor to:

allow a user to select a unit for viewing from the functional units using a selection panel; and display state information of the selected unit in a state panel.

32. The system of claim 25 wherein the computer system is a cellular multiprocessor system.

* * * * *